United States Patent [19]

Ichii et al.

[11] Patent Number: 5,450,403
[45] Date of Patent: Sep. 12, 1995

[54] METHOD AND APPARATUS FOR MULTIPLEX TRANSMISSION

[75] Inventors: Eiji Ichii; Yutaka Matsuda; Hideki Kimura, all of Tokyo; Hiroaki Sakamoto; Yoshikazu Nobutoki, both of Hiroshima, all of Japan

[73] Assignee: The Furukawa Electric Co., Ltd., Tokyo, Japan

[21] Appl. No.: 202,275

[22] Filed: Feb. 25, 1994

[30] Foreign Application Priority Data

Mar. 2, 1993 [JP] Japan .................................. 5-041426

[51] Int. Cl.$^6$ .............................................. H04L 1/08
[52] U.S. Cl. ................................ 370/85.1; 340/825.16; 340/825.62; 371/31; 371/68.2
[58] Field of Search ..................... 371/31, 48, 55, 57.1, 371/60, 65, 67.1, 68.2, 69.1; 340/825.06, 825.15, 825.16, 825.62; 370/85.1, 85.3, 85.15

[56] References Cited

U.S. PATENT DOCUMENTS

| | | | |
|---|---|---|---|
| 4,245,212 | 1/1981 | Cirimele | 340/825.62 |
| 4,356,485 | 10/1982 | Boschulte et al. | 340/825.62 |
| 4,626,708 | 12/1986 | Cooper | 371/67.1 |
| 4,766,596 | 8/1988 | Michels-Krohn et al. | 340/825.16 |
| 4,866,666 | 9/1989 | Francisco | 371/67.1 |

*Primary Examiner*—Benedict V. Safourek
*Attorney, Agent, or Firm*—Frishauf, Holtz, Goodman, Langer & Chick

[57] ABSTRACT

A multiplex transmission apparatus includes a communication control circuit connected to a bus for successively receiving data from the bus, and the received data is output from an output port to a load via an output circuit. The successively received data is once stored in a receiving buffer and is then transferred to the output port. A port control circuit, which is connected to the output port, monitors the data transferred to the output port. When at least part of the data does not change in a predetermined manner in response to the data received immediately before, the port control circuit controls data outputted from the output port so that loads controlled according to the data from the output port are held in a safe state.

21 Claims, 11 Drawing Sheets

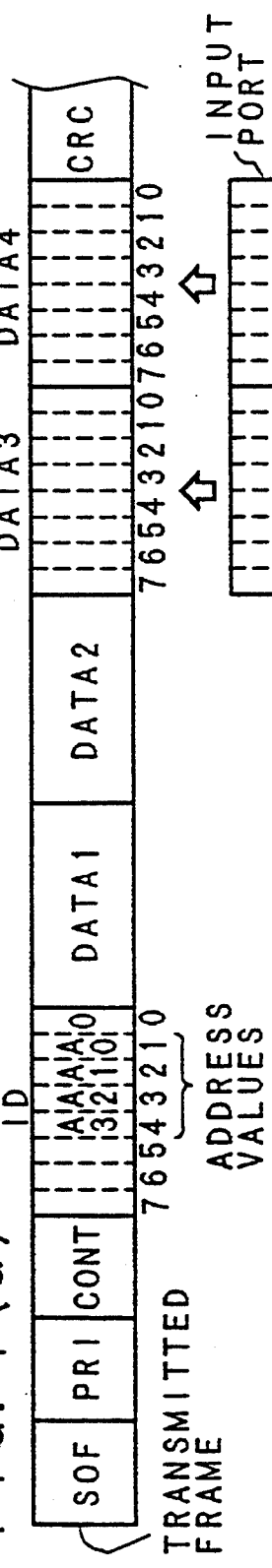
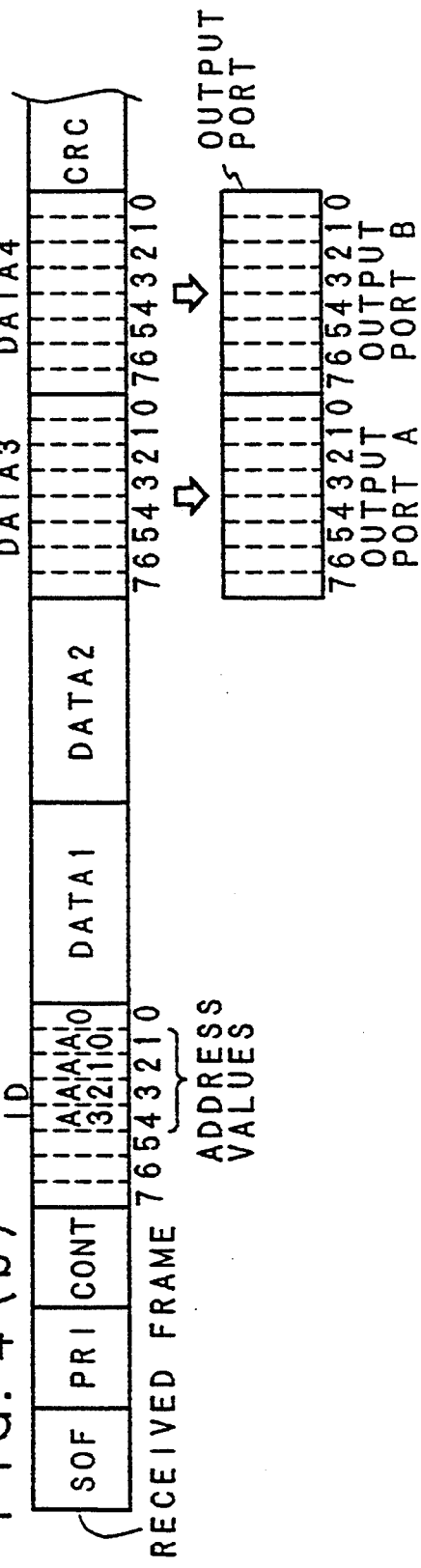
FIG. 4(a)
FIG. 4(b)

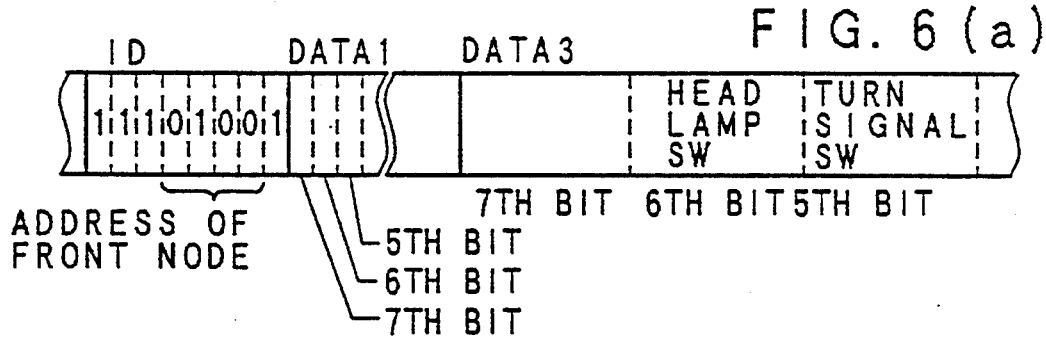
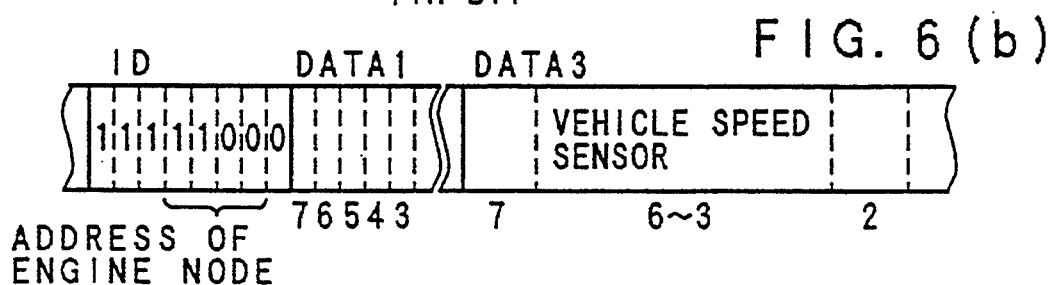
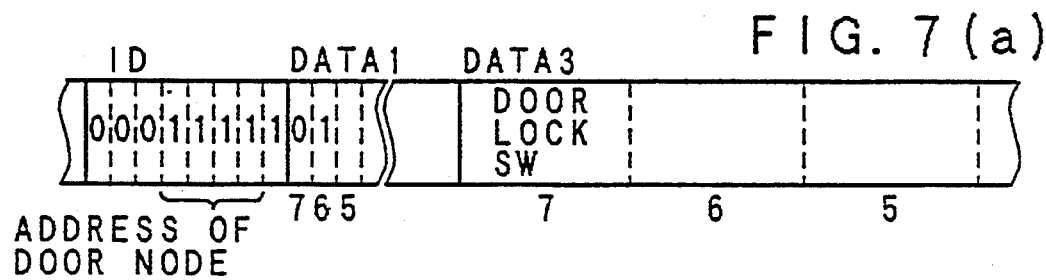
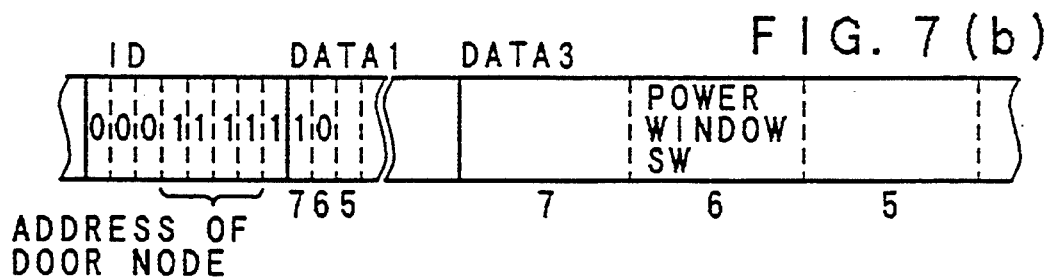
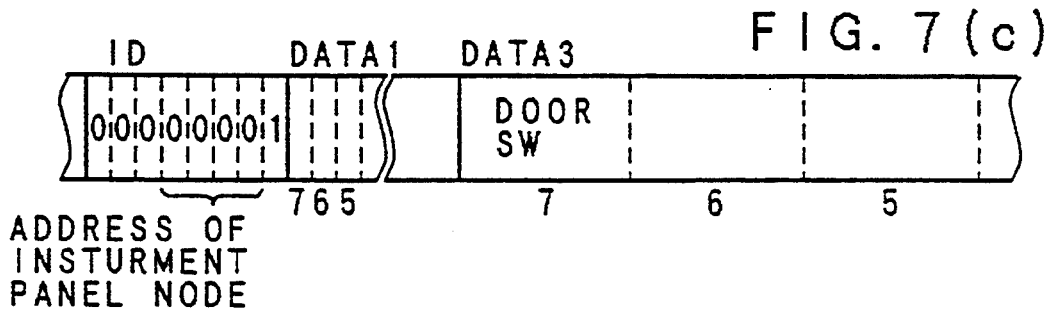

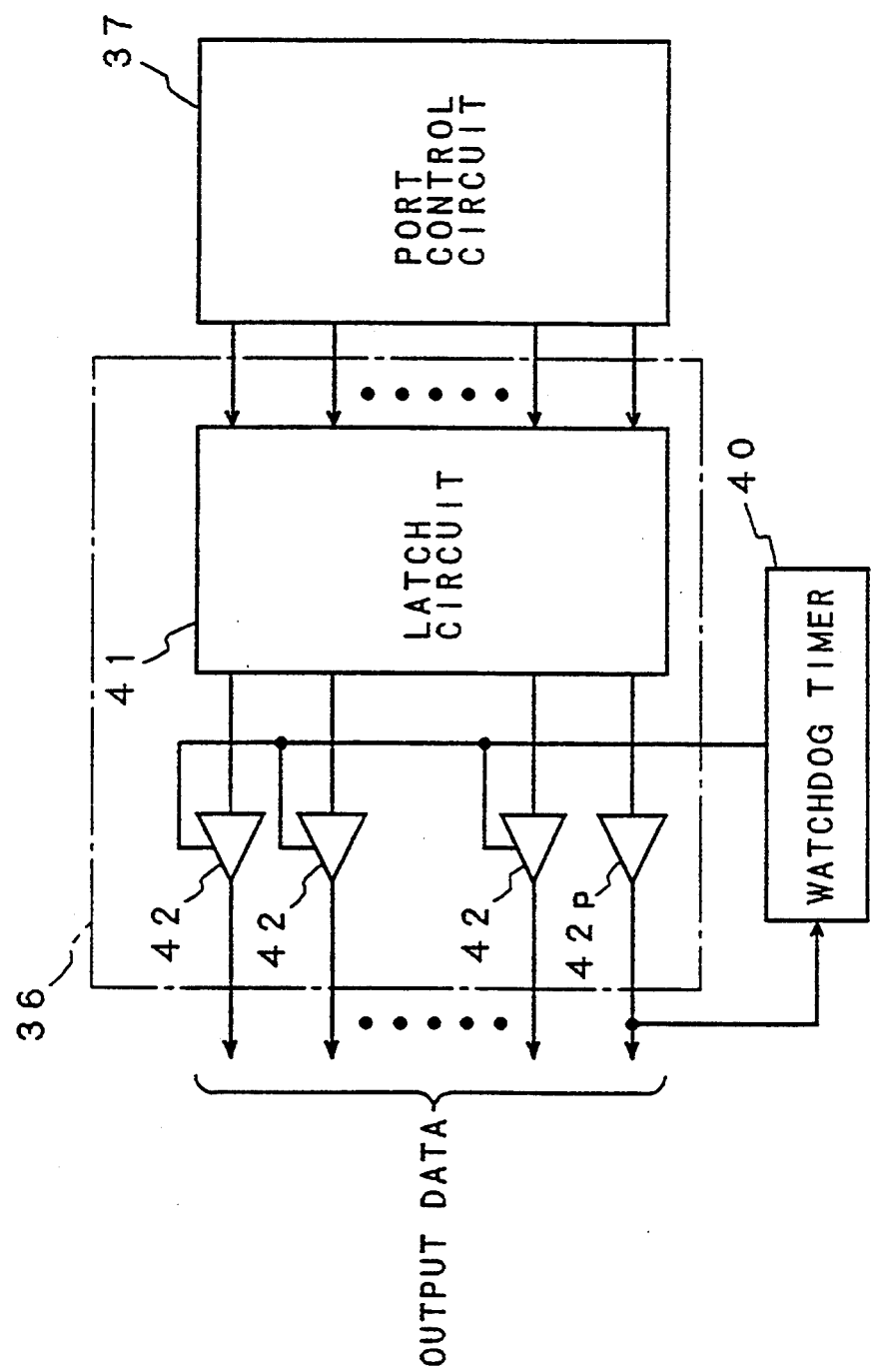

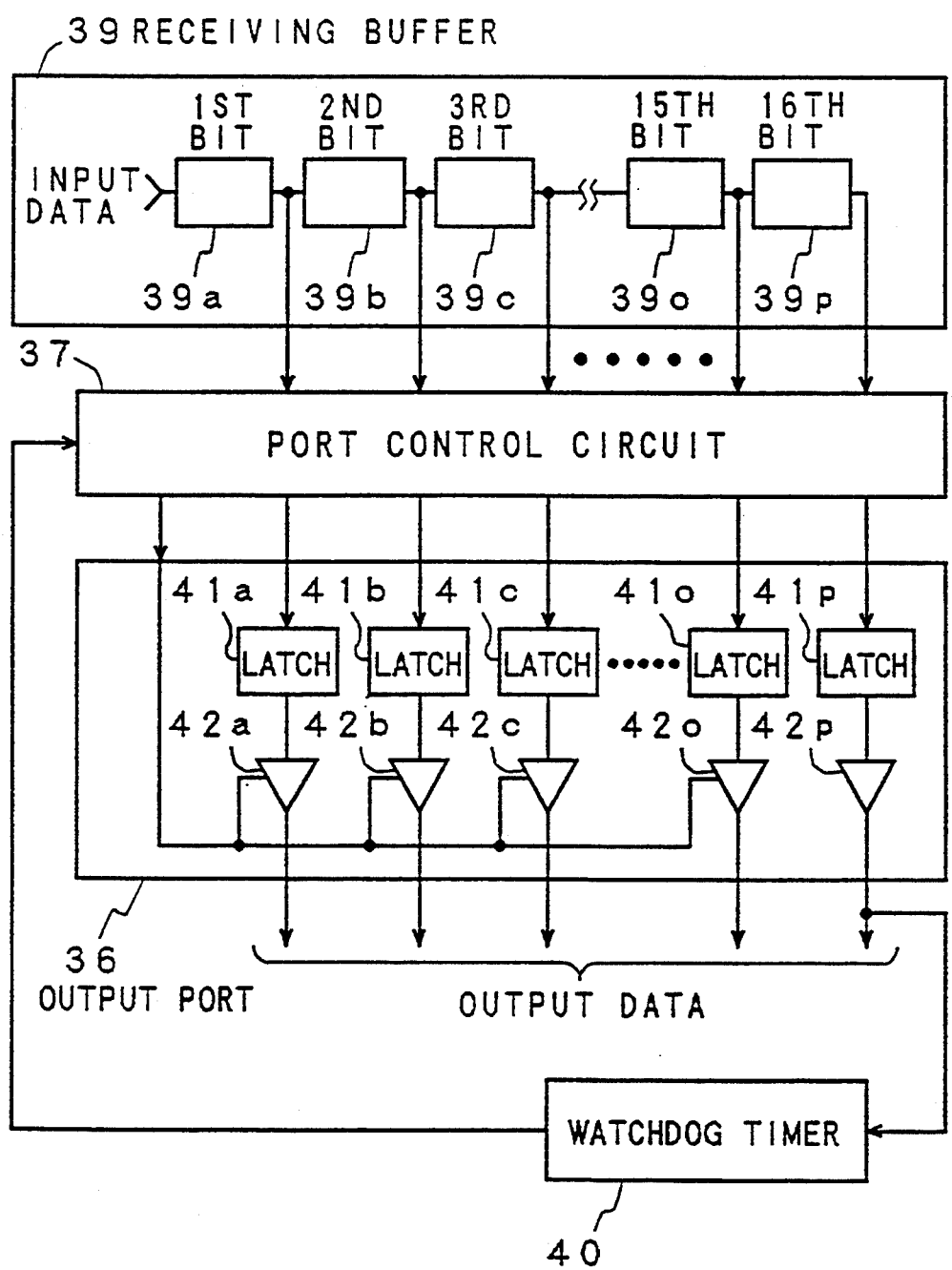

METHOD AND APPARATUS FOR MULTIPLEX TRANSMISSION

BACKGROUND OF THE INVENTION

1. Field of the Invention

This invention relates to a method and apparatus for multiplex transmission in which data frames are transmitted by means of a transmission technique called CSMA/CD (carrier sense multiple access/collision detection).

2. Description of the Related Art

In the aforementioned type of multiplex transmission methods, a plurality of multiplex transmission apparatuses is connected to a transmission line (bus) comprising, for example, a paired cable, and each multiplex transmission apparatus is composed at least of a communication control circuit (LSI), a receiving buffer memory (hereinafter referred to as "receiving buffer"), a port control circuit, and an output port. The LSI writes data of a frame format, supplied from the bus, in the receiving buffer, and then the port control circuit selects an output port in accordance with the contents of the written data, so as to output the data to a specific load to be controlled (hereinafter merely referred to as "load").

The multiplex transmission apparatuses interconnected by the bus constitute a network and employs, as the transmission technique, CSMA/CD (carrier sense multiple access/collision detection). The network composed of these multiplex transmission apparatuses is used, for example, as a local area network (LAN) for carrying out multiplex transmission of data within a motor vehicle.

Each multiplex transmission apparatus is unable to detect an erroneous state of its component parts, such as stoppage of the oscillation of a clock pulse generator for generating clock pulses in accordance with which the communication control circuit operates, or a fault of the communication control circuit itself. In such cases, unexpected data may appear at the output port, possibly causing abnormality of the load connected to the output port.

SUMMARY OF THE INVENTION

This invention was created in view of the above circumstances, and an object thereof is to provide a method and apparatus for multiplex transmission wherein abnormal states, such as a fault of a communication control circuit, stoppage of the oscillation of a clock pulse generator, fault of a transmission line, collision of signals on the transmission line, etc., can be detected, thereby enhancing the safety of the apparatus.

To achieve the above object, the present invention provides a method and apparatus for multiplex transmission. In the multiplex transmission method, data with a frame format is transmitted among multiplex transmission apparatuses (nodes) interconnected by a transmission line (bus), wherein a transmitting node successively transmits frames such that at least part of predetermined data in the frames changes in a predetermined manner, and a receiving node successively receives the frames transmitted from the transmitting node and outputs data in each of the frames from an output port thereof to a load to be controlled, the receiving node monitoring the predetermined data in each of the frames, and, when the at least part of the predetermined data does not change in the predetermined manner, as compared with the predetermined data in the frame received immediately before, controlling the output port to set the same in a predetermined state.

In the above multiplex transmission method, the predetermined data (specific data) is set such that a specific bit thereof, for example, changes in a predetermined pattern at predetermined intervals of time, and when the specific bit does not change according to the predetermined pattern, a port control circuit sets the output port in a predetermined state such that the load connected to the output port is held in a safe state. Accordingly, even in cases where unexpected data is written in a receiving buffer due to fault of a communication control circuit or stoppage of the oscillation of a clock pulse generator, the output port is brought to the predetermined state, whereby abnormality of the load is prevented and the safety of the system is enhanced. Particularly, where the data from the output port is monitored, all operations from the reception of signals from the transmission line to the output of data from the output port can be monitored, thus making it possible to further enhance the reliability of the system.

Preferably, at least one of the output ports whose data is monitored is no set in the predetermined state, so that the node can resume normal operation when the system recovers from temporary communication incapability, thereby improving the transmission efficiency of the system.

BRIEF DESCRIPTION OF THE DRAWINGS

FIGS. 4(a) and 4(b) are diagrams showing specific examples of the data frame shown in FIG. 2;

FIGS. 6(a) and 6(b) are diagrams showing part of data frames transmitted between the nodes shown in FIG. 1;

FIGS. 7(a), 7(b) and 7(c) are diagrams which show part of data frames transmitted between the nodes shown in FIG. 1;

FIG. 11 is a diagram showing another example of the arrangement of the output port, port control circuit, and watchdog timer shown in FIG. 8; and FIG. 12 is a diagram showing an example of the arrangement of a receiving buffer, port control circuit, and output port shown in FIG. 8.

DESCRIPTION OF THE PREFERRED EMBODIMENTS

A method and apparatus for multiplex transmission according to embodiments of this invention will be described with reference to FIGS. 1 through 12.

Figure 1:
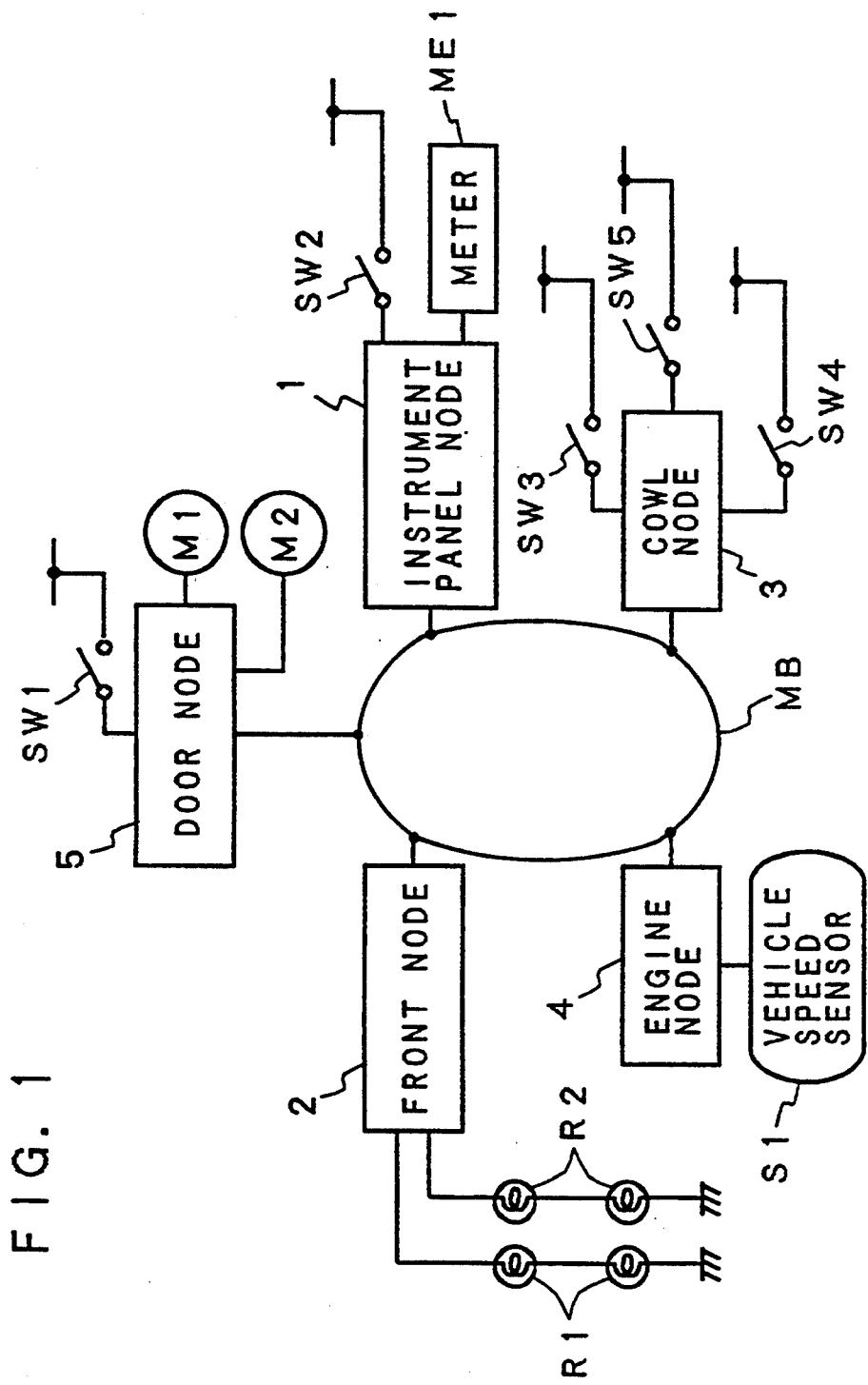
FIG. 1 is a block diagram showing the configuration of a multiplex transmission system using a multiplex transmission method according to this invention.

FIG. 1 illustrates, by way of example, the configuration of a multiplex transmission system using a multiplex transmission method according to this invention.

Referring to FIG. 1, the multiplex transmission system is composed of a plurality of multiplex transmission apparatuses (hereinafter referred to as "nodes") 1 to 5, and a transmission line (bus) MB interconnecting the nodes 1 to 5. Each of the nodes is connected to the bus MB via a bus interface circuit, as mentioned later, and transmits and receives data with a frame format to and from the other nodes connected to the bus MB. The topology of the multiplex transmission system according to this invention may be of any desired type, such as a bus type, ring type, star type or the like.

One of specific applications of the multiplex transmission system according to this invention is a system installed in a motor vehicle, in which nodes are connected to various loads to be controlled, such as switches, sensors and actuators arranged at respective locations, through a harness (wiring) to control the electrical equipment of the vehicle.

Specifically, in FIG. 1, the multiplex transmission system for such automobile use comprises an instrument panel node 1, a front node 2, a cowl node 3, an engine node 4, a door node 5, and a bus MB.

The instrument panel node 1 is arranged in the vicinity of meters ME1, and drives the meters ME1 in accordance, for example, with data supplied from a vehicle speed sensor S1. Further, the instrument panel node 1 turns on and off an indicator lamp, which is one of the meters ME1, in accordance with an ON-OFF signal of a door switch SW1 supplied from the door node 5. The instrument panel node 1 is also connected to a power window switch SW2 for driving a power window motor M1.

The front node 2 is arranged at the front of the motor vehicle, and drives head lamps R1 and turn signal lamps R2 at the front of the vehicle, in accordance with ON-OFF signals of a head lamp switch SW3 and turn signal switch SW4 supplied from the cowl node 3.

The cowl node 3 is arranged in the vicinity of a cowl of the vehicle, and connected to the head lamp switch SW3, the turn signal switch SW4, and a door lock switch SW5 for driving a door lock motor M2.

The engine node 4 is arranged in the vicinity of the engine, is connected to the vehicle speed sensor S1, and controls the engine and transmission. This control operation is carried out by a microcomputer in the engine node, an accordance with data such as vehicle speed supplied from the sensor S1. Further, the engine node 4 transmits sensor data to the other nodes; for example, it encodes the data from the vehicle speed sensor S1 and transmits the encoded data to the instrument panel node 1.

The door node 5 is arranged in the vicinity of a door, and connected to the door switch SW1, the power window motor M1, and the door lock motor M2. The door switch SW1 is in an ON state when the door associated therewith is open, and this ON signal is transmitted from the door node 5 to turn on the indicator lamp of the instrument panel node 1. Also, the door node 5 drives the power window motor M1 to raise or lower the windowpane in accordance with an ON-OFF signal of the power window switch SW2 supplied from the instrument panel node 1. Further, the door node 5 drives the door lock motor M2 to lock or unlock the door in accordance with an ON-OFF signal of the door lock switch SW5 supplied form the cowl node 3.

In the multiplex transmission system described above, one physical address is usually assigned to one node. In this embodiment, each physical address consists of 4-bit data (A3, A2, A1, A0). Specifically, the instrument panel node 1 is assigned address 0 (0000), the front node 2 is assigned address 4 (0100), the cowl node 3 is assigned address 8 (1000), the engine node 4 is assigned address (1100), and the door node 5 is assigned address 15 (1111). The address allocation is not limited to this alone, and the addresses may be allocated differently so as to be best suited to the system.

Figure 2:
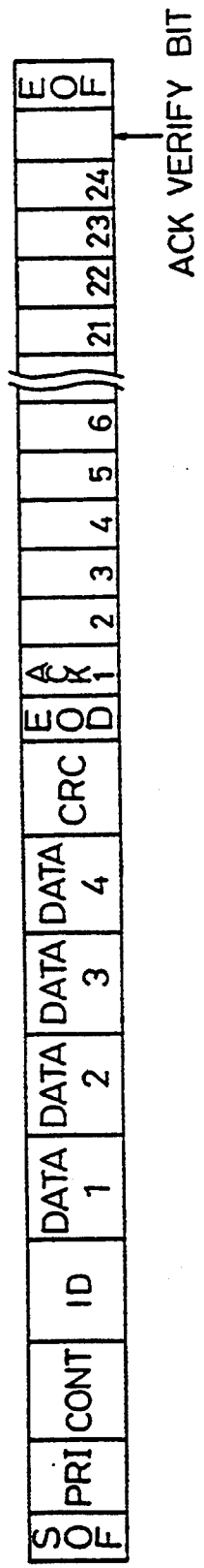
FIG. 2 is a diagram showing an example of a format of a data frame transmitted between nodes shown in FIG. 1.

FIG. 2 illustrates an example of a format of a data frame transmitted among the nodes via the bus MB. As shown in FIG. 2, the data frame is composed of SOF (start-of-frame), a priority (PRI), ID, a control data area (CONT), DATA1 to DATA4, CRC, EOD (end-of-data), an acknowledgment (ACK) signal area, an ACK verify bit area, and EOF (end-of-frame).

SOF indicates the start of a frame, and PRI serves to determine the order of priority when data is simultaneously transmitted from a plurality of nodes to the bus MB. ID indicates the contents of the subsequent data (DATA), and CONT indicates an area containing data-length data. DATA1 to DATA4 are data areas having respective lengths (variable lengths) indicated by CONT, and in this embodiment, DATA1 to DATA4 each consist of 8-bit data, for example. CRC denotes an error check code, and EOD indicates the end of the data. The ACK signal area is an area to which an ACK signal is returned from each of the nodes on a bit-by-bit basis, and consists of, e.g., 24 bits. The ACK verify bit area is a one-bit area for indicating that the ACK signal has been returned from each of the registered nodes and thus the data transmission is complete. EOF indicates the end of the frame.

Figure 3:
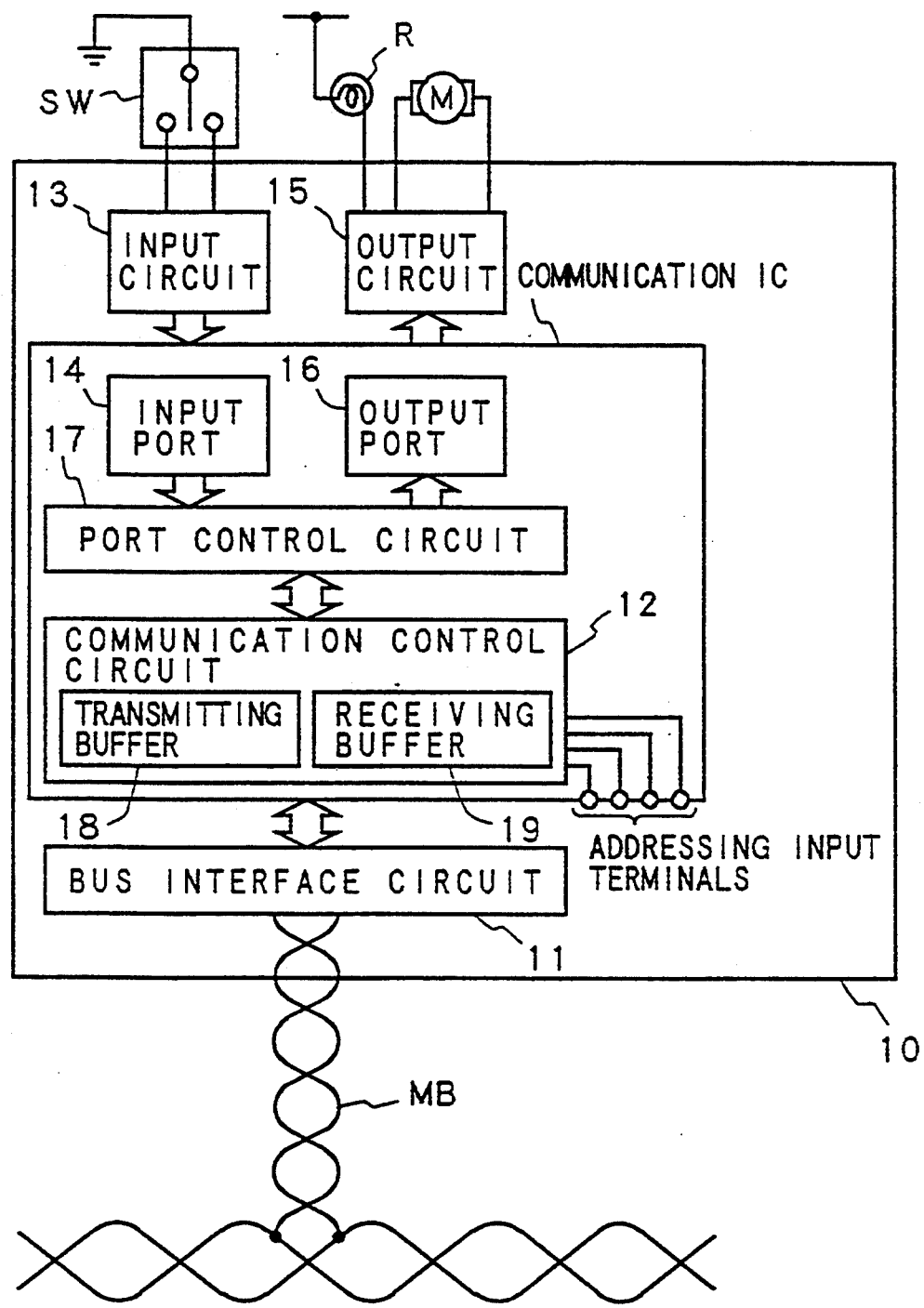
FIG. 3 is a block diagram showing the arrangement of a node according to a first embodiment of this invention.
Figure 5:
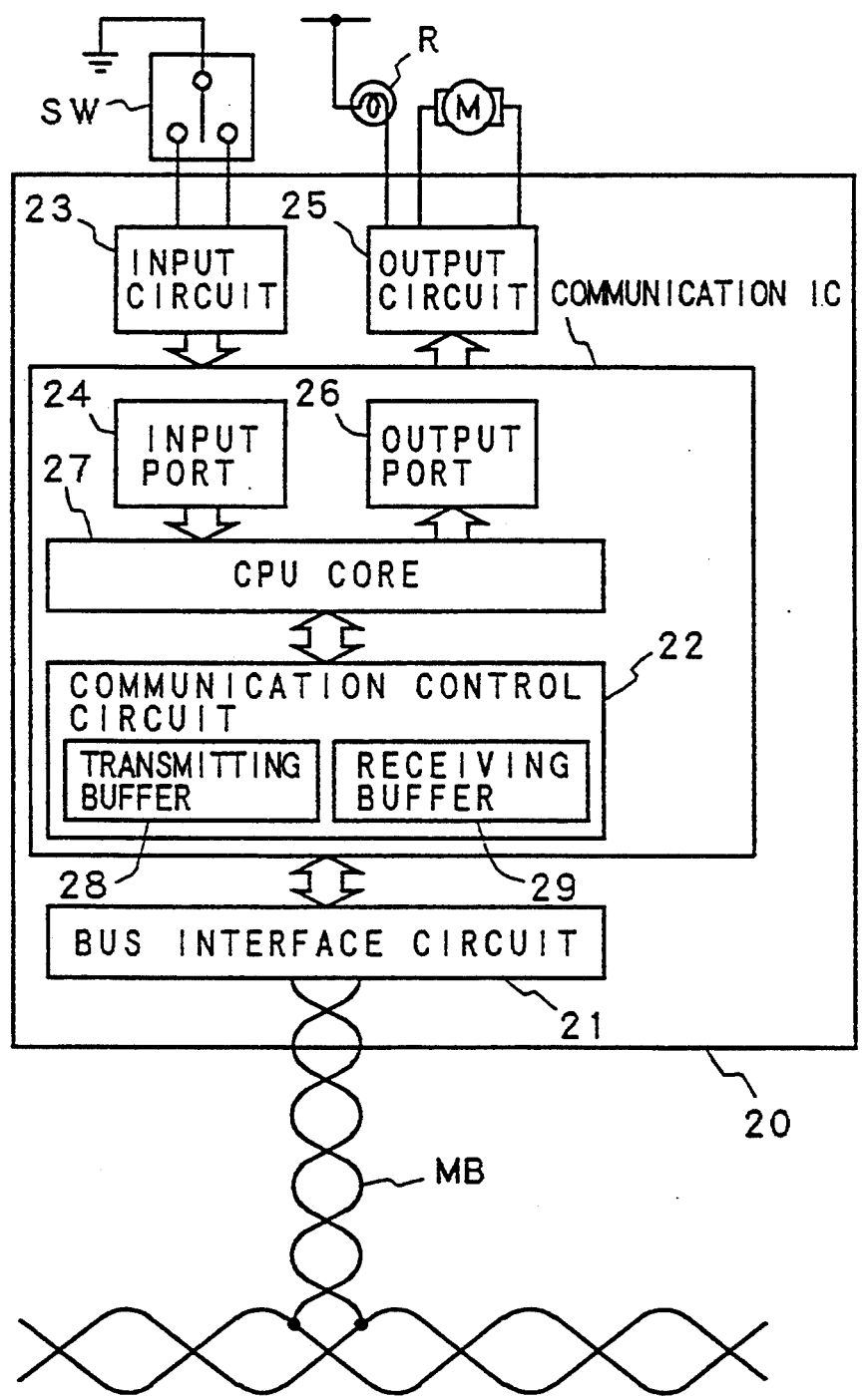
FIG. 5 is a block diagram showing the arrangement of a node according to a second embodiment of this invention.

The above-described nodes may have either the arrangement shown in FIG. 3 or that shown in FIG. 5.

Referring first to FIG. 3, in a node 10 according to a first embodiment, the data input/output control function is achieved by hardware, thus eliminating the need to use a microcomputer. The node 10 comprises a bus interface circuit 11, a communication control circuit 12, an input circuit 13, an input port 14, an output circuit 15, an output port 16, a port control circuit 17, a transmitting buffer memory (hereinafter referred to as "transmitting buffer") 18 for storing data to be transmitted, and a receiving buffer 19 for storing received data.

The input circuit 13 is supplied with signals from various loads such as switches SW, in the form of parallel signals, and outputs the input signals to the input port 14. The port control circuit 17 monitors the values of various input signals supplied to the input port 14, and when part or all of the signals values change, supplies the values of the input signals to the communication control circuit 12. The communication control circuit 12 stores, as input data, the values of the input signals in the transmitting buffer 18, creates a frame based on the input data, and transmits the frame to the bus MB via the bus interface circuit 11. It is here assumed that the input port 14 is composed of an 8-bit input port A and an 8-bit input port B, and thus has a 16-bit configuration.

A specific example of the transmission frame created in this manner is shown in FIG. 4(a). In this transmission frame, the individual bits in the data areas DATA3 and DATA4 correspond to the respective bits of the input port 14. Specifically, in the illustrated example, bits 7 to 0 of the input port A correspond, respectively, to bits 7 to 0 of DATA3, and bits 7 to 0 of the input port B correspond, respectively, to bits 7 to 0 of DATA4.

The communication control circuit 12 also receives signals on the bus MB via the bus interface circuit 11. On detecting the start bit, the communication control circuit 12 recognizes that a frame is on the transmission line, and then temporarily stores the received data in the receiving buffer 19. When the received frame is recognized, the communication control circuit 12 determines based on CONT and ID whether the received frame contains data necessary for its node. If the received frame contains necessary data, and if the frame reception is properly completed, the communication control circuit 12 transfers the data in the receiving buffer 19 to the port control circuit 17.

The port control circuit 17 transfers the input data to corresponding ports of the output port 16, which then outputs the data to specified loads, such as the motors M and lamps R, via the output circuit 15 to drive the loads. The output port 16 is composed of an 8-bit output port A and an 8-bit output port B, and thus has a 16-bit configuration.

FIG. 4(b) illustrates a specific example of the frame received in this manner. In the received frame, the individual bits in the data areas DATA3 and DATA4 correspond to the respective bits of the output port 16. Specifically, in the illustrated example, bits 7 to 0 of the output port A correspond,-respectively to bits 7 to 0 of DATA3, and bits 7 to 0 of the output port B correspond, respectively, to bits 7 to 0 of DATA4.

The communication-control circuit 12 detects a fault of the bus MB, collision of signals on the bus MB, etc., to achieve a proper control operation. Namely, the node 10 is so constructed that undesired data may not be written in the receiving buffer 19 or transferred to the output port 16 via the port control circuit 17. Further, at least one of the other nodes connected to the bus MB, i.e., at least one originating node, is designed to repeatedly transmit specific data at predetermined intervals of time. If the specific data is properly transmitted to the bus MB, and if the communication control circuit 12 properly receives and recognizes the specific data, the specific data is transferred to the output port 16 via the receiving buffer 19 and the port control circuit 17.

In this embodiment, the specific data corresponds, for example, to the most significant bit (MSB) of DATA3 shown in FIG. 4(b), i.e., the Seventh bit, which alternately assumes the value "1" and "0" at intervals of 100 ms. Accordingly, the seventh bit among the bits 0 to 7 of the output port A alternately turns to high-level "H" and low-level "L" at intervals of 100 ms.

In this case, the port control circuit 17 controls the ports as described below. The port control circuit 17 monitors the specific data stored in the receiving buffer 19. If the specific data conforms to a predetermined pattern (e.g., alternation between "1" and "0"), the port control circuit 17 transfers the data in the receiving buffer 19 directly to the output port 16. If the specific data does not conform to the predetermined pattern, the port control circuit 17 immediately brings part or the whole of the output port 16 to a predetermined state. Preferably, the predetermined state set by the port control circuit 17 is a state in which the loads connected to the output port 16 can be held in a safe state.

Thus, in this embodiment, the port control circuit monitors the MSB of DATA3 which value changes at the predetermined intervals of time. Therefore, when unexpected data s written in the receiving buffer due an abnormal state, such as a fault of the communication control circuit, stoppage of the oscillation of a clock pulse generator, fault of the transmission line, or collision of signals on the transmission line, and thus the MSB changes abnormally, the output port can be brought to the predetermined state. Consequently, the loads are held in a safe state, thereby preventing abnormal operation of the loads.

In the node 10, the communication control circuit 12, the input port 14, the output port 16, and the port control circuit 17 are packaged into a single communication IC, and the node 10 does not include a microcomputer for communication control (this type of nodes is hereinafter referred to as "I/O node"). Accordingly, frames to be transmitted and received should preferably be of a type which the communication control circuit 12 can easily create by reading the value input via addressing input terminals or the like. Specifically, the priority is determined by a physical address or the like, which eliminates the need to use special priority-setting terminals and reduces the number of terminals, whereby the communication control circuit 12 can be reduced in scale.

If frames to be transmitted and received have the same ID, a node cannot distinguish the frame transmitted therefrom from a frame originated by another node, so that it may erroneously drive the load connected thereto in response to the frame generated thereby. To eliminate the drawback, in this embodiment, the logic value of the last bit in the ID is changed, for example, so that the ID inserted in the frame to be transmitted differs from that of a frame which is to be received.

Namely, as shown in FIG. 4, the frame ID consists of 8-bit data, and the zeroth bit of the ID is set to logical "0" in the case of the transmitted frame shown in FIG. 4(a), and is set to logical "1" in the case of the received frame shown in FIG. 4(b). The fourth to first bits of the ID correspond to the address values A3, A2, A1 and A0, respectively. The seventh to fifth bits of the ID are all fixed at, e.g., logical "1", so as to indicate that the frame transmitted or received is originated by an I/O node.

The I/O node includes no microcomputer, and thus is not a node for carrying out complicated control on, e.g., meters. The I/Onode is suitable as a node for input/output use only, which is not required to have control functions, such as reception of ON-OFF data from switches or generation of signals for turning on lamps. In FIG. 1, the front node 2 and the engine node 4 each comprise such an I/O node.

Referring now to FIG. 5, a node 20 according to a second embodiment is composed of a bus interface circuit 21, a communication control circuit 22, an input circuit 23, an input port 24, an output circuit 25, an output port 26, a CPU core 27, a transmitting buffer 28, and a receiving buffer 29. In this node 20, the communication control circuit 22, the input port 24, the output port 26, and the CPU core 27 are packaged into a single communication IC.

The CPU core 27 reads a signal from a switch SW via the input port 24, and supplies the read data to the communication control circuit 22. On receiving a transmission start signal from the CPU core 27, the communication control circuit 22 transfers the data to the bus interface circuit 21 in a frame format.

When supplied with a frame from the bus interface circuit 21, the communication control circuit 22 stores the data of the received frame in the receiving buffer 29, and also notifies the CPU core 27 of the reception of the frame. The CPU core 27, thus notified of the frame reception, reads the data stored in the receiving buffer 29, and determines based on the CONT and ID in the frame whether the frame is necessary for this node 20. When the reception of the frame necessary for the node 20 is completed, the CPU core 27 controls the loads connected to the output circuit 25, in accordance with the received data.

Also in this embodiment, the MSB in DATA3, which is transmitted from the communication control circuit of an originating node and alternately changes at predetermined intervals of time, is monitored by the CPU core. Thus, when unexpected data is written in the receiving buffer and thus the MSB is abnormal, the CPU core 27 controls the output port to bring it to a predetermined state.

This type of nodes, namely, the node 20 including a microcomputer for communication control, is hereinafter called "basic node." The basic node 20 is capable of storing IDs of frames to be transmitted therefrom or to be received, in an exclusive storage area of, e.g., a RAM, in the microcomputer, by means of initial setting at the time when the node is powered, for example. Accordingly, the basic node 20 can deal with a plurality of frames, i.e., transmit and receive frames having different IDs. The basic node 20 can handle a large number of transmission/reception signals and thus is suited for use as a node which is required to have a control function to control, e.g., a plurality of meters. In FIG. 1, the basic node is used for the instrument panel node 1, the cowl node 3, and the door node 5.

Specific examples of frames transmitted in the multiplex transmission system of FIG. 1 are shown in FIG. 6. In this multiplex transmission system, the basic node having the arrangement shown in FIG. 5 is used for the instrument panel node 1, the cowl node 3, and the door node 5, and the I/O node having the arrangement shown in FIG. 3 is used for the front node 2 and the engine node 4, as mentioned above.

The engine node 4 carries out complicated control on the engine and transmission, and a special microcomputer may be required for the control. In such a case, the engine node 4 may be configured as an I/O node for input/output control, in which a microcomputer is used, in place of the input and output circuits 13 and 15 shown in FIG. 3, to connect the communication IC to the individual loads. That is, in this I/O node, the input port 14 has input terminal thereof connected to an output port of the microcomputer, and the output port 16 and the vehicle speed sensor S1 are connected to respective input ports of the microcomputer.

The communication control circuit of this I/O node transmits a frame in accordance with a change in the input port thereof. Thus, when transmitting a frame in accordance with a change in the input signal from the vehicle speed sensor S1, the microcomputer permits the transmission of the frame by changing its own output port. In this case, since the microcomputer is capable of changing the port values of the input port 14 as desired, the data transmission interval can be set freely. Further, in this I/O node, the microcomputer calculates the intervals of pulses supplied from the vehicle speed sensor S1, then encodes the calculated value into, in this example, 4-bit data, and outputs the encoded data from an output port thereof to the input port 14 of the communication IC for transmission.

FIG. 6(a) shows a frame transmitted from the cowl node 3 to the front node 2, and as illustrated, the sixth and fifth bits in DATA3 are allocated, respectively, to data from the head lamp switch SW3 and data from the turn signal switch SW4. This frame is received by the front node 2 which is an I/O node, and therefore, the ID thereof is "11101001" as explained with reference to FIG. 4.

FIG. 6(b) shows a frame transmitted from the engine node 4 to the instrument panel node 1, and as illustrated, the sixth to third bits in DATA3 are allocated to the 4-bit data from the vehicle speed sensor S1. The signal from the vehicle speed sensor S1, which is used for driving the meters ME1, is a continuous signal; therefore, it must be transmitted cyclically at short intervals, e.g., at intervals of several hundreds of milliseconds. The illustrated frame is transmitted from the engine node 4 which is an I/O node, and thus the ID thereof is "11111000".

FIG. 7(a) shows a frame transmitted from the cowl node 3 to the door node 5, and as illustrated, the seventh bit in DATA3 is allocated to data from the door lock switch SW5. This frame is transmitted between the basic nodes, and the ID thereof is "00011111" which includes the address value specifying the door node 5 as a receiving node. Frames with this ID are necessary for the door node 5; therefore, the door node 5 previously stores this ID in the RAM of the microcomputer.

FIG. 7(b) shows a frame transmitted from the instrument panel node 1 to the door node 5, in which the sixth bit in DATA3 is allocated to data from the power window switch SW2. The data from the power window switch SW2 forms a door control signal, like the data from the door lock switch. SW5, and accordingly, the frame ID is "00011111" which is identical to that of the frame shown in FIG. 7(a).

The instrument panel node 1 and the cowl node 3 transmit frames with the same ID; therefore, these frames are configured such that DATA1 provides a valid/invalid bit function (hereinafter referred to as "V/I") for indicating the validity or invalidity of data. The V/I function is achieved by associating the bits in DATA1 with the respective bits in DATA3. Specifically, to achieve the V/I function, the logic value of a bit in DATA1 which corresponds to a control-related bit in DATA3 is set to "0", and the logic value of a bit in DATA1 which corresponds to a control-unrelated bit in DATA3 is set to "1", so that the receiving node can determine which data bit in the frame is to be used for control operation.

In the frame shown in FIG. 7(a), the seventh and sixth bits in DATA3 represent control-related data and control-unrelated data, respectively, and accordingly, the seventh and sixth bits in DATA1 are set to logical "0" and "1", respectively. In the frame shown in FIG. 7(b), the seventh and sixth bits in DATA3 represent control-unrelated data and control-related data respectively; therefore, the seventh and sixth bits in DATA1 are set to logical "1" and "0", respectively.

In the case of not using the V/I function an OFF signal for the door lock switch SW5, for example, may be transmitted from the cowl node 3 when the instrument panel node 1 is transmitting an ON signal for the power window switch SW2 and thus the window is open. In this case, since the cowl node 3 does not retain data related to the power window switch SW2, the sixth bit in DATA3 of the frame shown FIG. 7(b) does not necessarily carry a correct value. Nevertheless the door node 5 performs control operation based on the frame received from the cowl node 3, because the ID of the received frame indicates that the frame is necessary for the door node 5, with a possible result that the open window is erroneously closed. Thus, these signals must be affixed with different IDs.

In the case of using the V/I function, as in this embodiment, the sixth bit in DATA3 can be specified as an invalid bit when the cowl node 3 transmits data associated with the door lock switch SW5, in which case, erroneous operation is prevented even if another frame with the same ID is transmitted.

FIG. 7(c) illustrates a frame transmitted from the door node 5 to the instrument panel node 1, in which the seventh bit in DATA3 is allocated to data from the door switch SW1. This frame is transmitted between the basic nodes, and the ID thereof is "00000001" which includes the address value specifying the instrument panel node 1 as a receiving node. Frames with this ID are necessary for the instrument panel node 1; therefore, the instrument panel node 1 previously stores this ID in the RAM of the microcomputer.

In the multiplex transmission system of this embodiment, the signals from the head lamp switch SW3 and the power window switch SW2 are considered to be particularly important.

To eliminate such inconveniences, in this embodiment, the cowl node transmits frames at intervals of 100 ms such that the seventh bit in DATA3 of the frame shown in FIG. 6(a) alternately assumes "1" and "0". The front node 2, which receives the frame, outputs the data to the seventh bit of the output port A corresponding to the seventh bit in DATA3, and hence the seventh bit of the output port A alternately changes to high-level "H" and low-level "L" at intervals of 100 ms.

Figure 8:
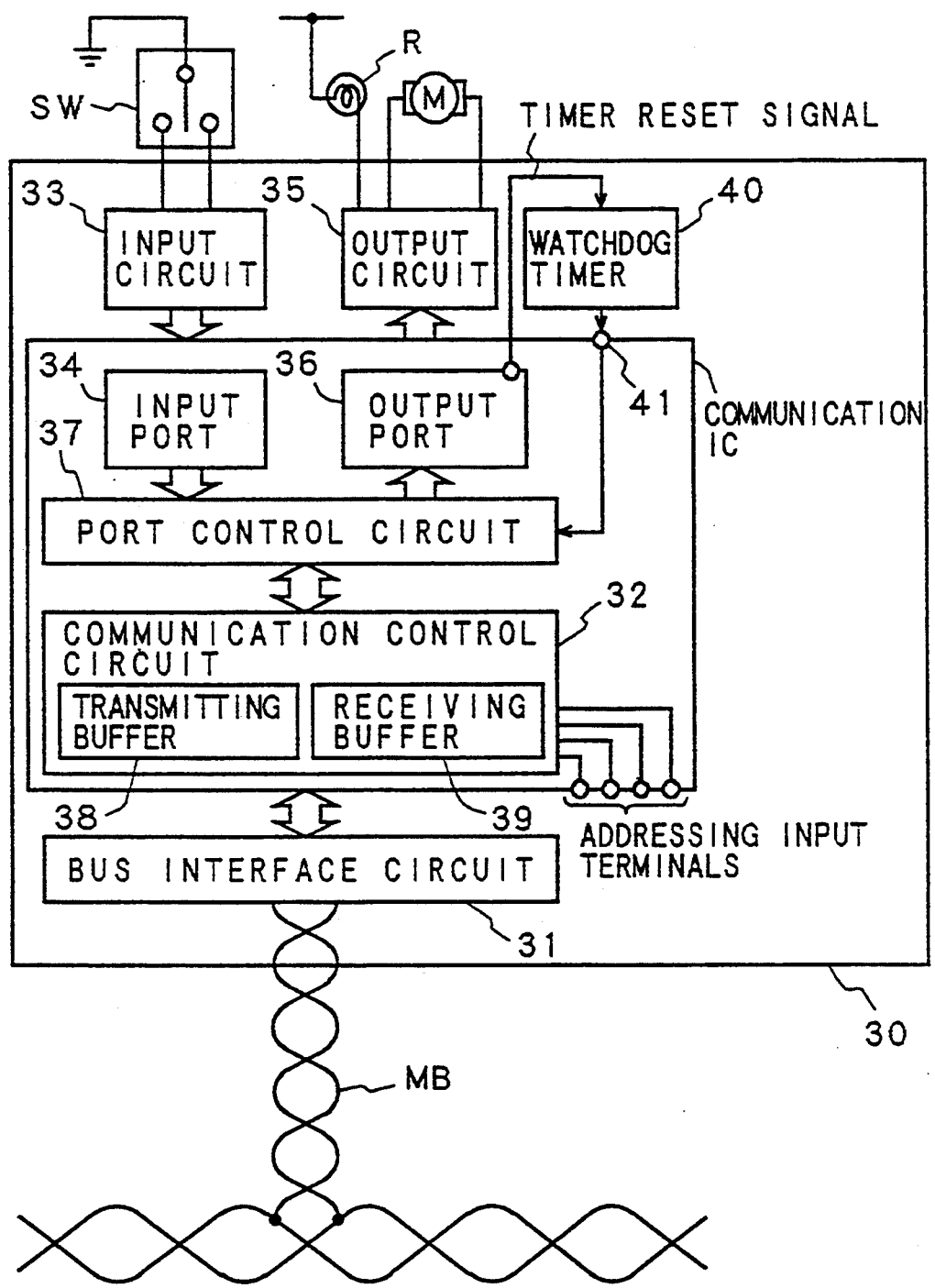
FIG. 8 is a block diagram showing the arrangement of a node according to a third embodiment of this invention.
Figure 9:
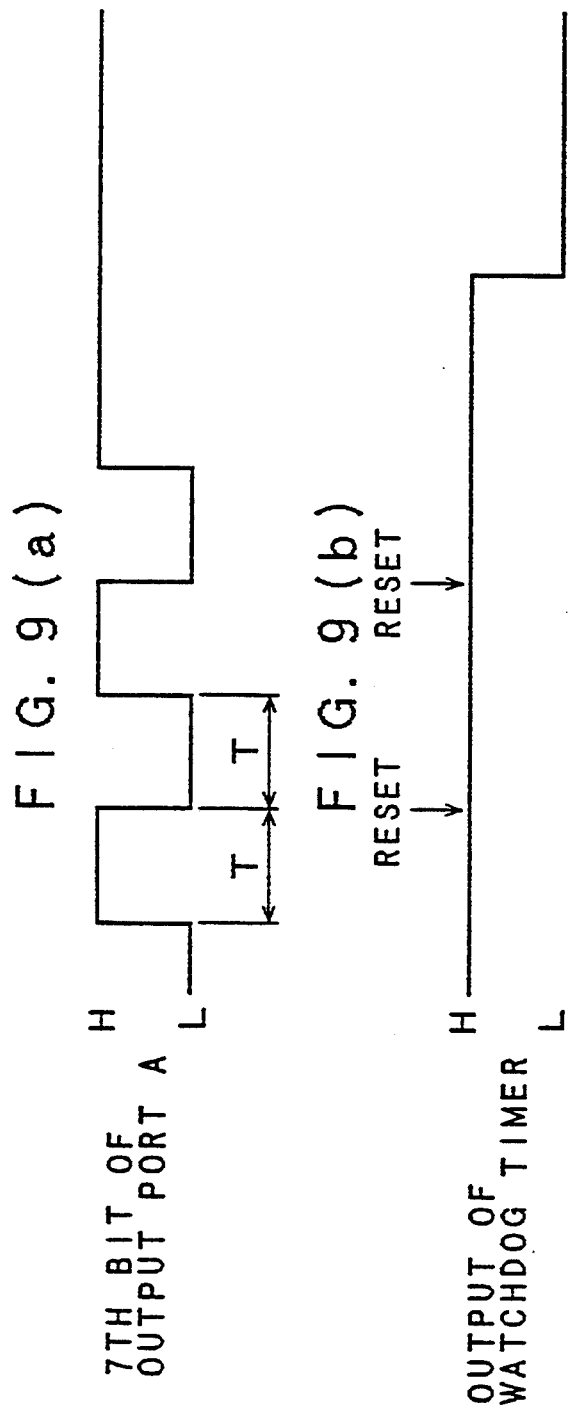
FIGS. 9(a) and 9(b) are waveform charts showing an example of time-based changes of specific data and the output of a watchdog timer.

FIG. 8 illustrates the arrangement of a node according to a third embodiment of this invention. In FIG. 8, the bus interface circuit 31, the communication control circuit 32, the input circuit 33, the input port 34, the output circuit 35, the output port 36, the port control circuit 37, the transmitting buffer 38, and the receiving buffer 39 are identical with corresponding elements shown in FIG. 3, and therefore, description of these elements is omitted.

In the embodiment shown in FIG. 8, among a plurality of data items output from the output port 36, at least one specific data item, e.g., the data corresponding to the seventh bit of the output port A shown in FIG. 4(b), is extracted. The extracted output data is then supplied to a watchdog timer (hereinafter merely referred to as "timer") 40 as a timer reset signal, to reset the value of the timer 40 to an initial value.

As shown in FIG. (b), the timer 40 normally outputs a high-level "H" signal, for example. If no reset signal is input within a timer period preset by a device including, e.g., a resistor and a capacitor, the output of the timer 40 turns to low-level "L." To reset the timer 40, the output data corresponding to the seventh bit of the output port A is extracted as mentioned above, and the timer 40 is reset in synchronism with the trailing edge (change from "H" to "L") of the extracted data, as shown in FIG. 9(a). Normally, therefore, the timer 40 is reset every 200 ms.

Thus, if the timer period is preset, e.g., to 250 ms significantly longer than 200 ms, then the output of the timer 40 remains unchanged. Optimum values for the timer period and the transmission interval may vary depending on the system configuration.

If normal communication fails due to a fault of the transmission line, bus interface circuit, communication control circuit, port control circuit, or output port, abnormal data is supplied to the output port. Namely, the port is fixed at "H" or "L". In this case, the reset signal is not supplied to the timer within the period 250 ms; therefore, the timer output changes from "H" to "L". The timer output is supplied to the port control circuit 37 via a fail-safe terminal 41 of the communication IC, as shown in FIG. 8.

On detecting the change of the timer output to "L", the port control circuit 37 judges that the output of the port disagrees with the predetermined pattern (in this example, alternation between "0" and "1" at the predetermined intervals of time). Then, the port control circuit 37 immediately brings part or the whole of the output port 36 to a predetermined state.

In this case, at least the output port connected to the timer 40 is maintained at the normal state. Here, let it be assumed that normal communication temporarily fails due to external noise or the like, and then recovers upon lapse of a short time. In such a case, if the output port connected to the timer (in this example, the seventh bit of the output port A) is changed to a predetermined state, no reset signal is supplied to the timer when normal communication is recovered. As a result, the node concerned becomes disabled, and the performance of the motor vehicle remains degraded.

Preferably, the predetermined state set by the port control circuit 37 is a state in which the loads connected to the output port 36 can be held in a safe state. In the case of the front node 2, keeping the head lamps R1 turned on is safe; therefore, the sixth bit of the output port A is preferably fixed at ON state.

The predetermined state may be a state in which each output port is selectively set to "H" or "L" level, or a state in which part or all of the output ports are set at a high impedance state. In the case of setting the output port at high impedance state, however, certain output ports need be pulled up or down, depending upon the load states. Since the pull-up/pull-down logic can be set by an external circuit, the degree of freedom can be increased.

Figure 10:
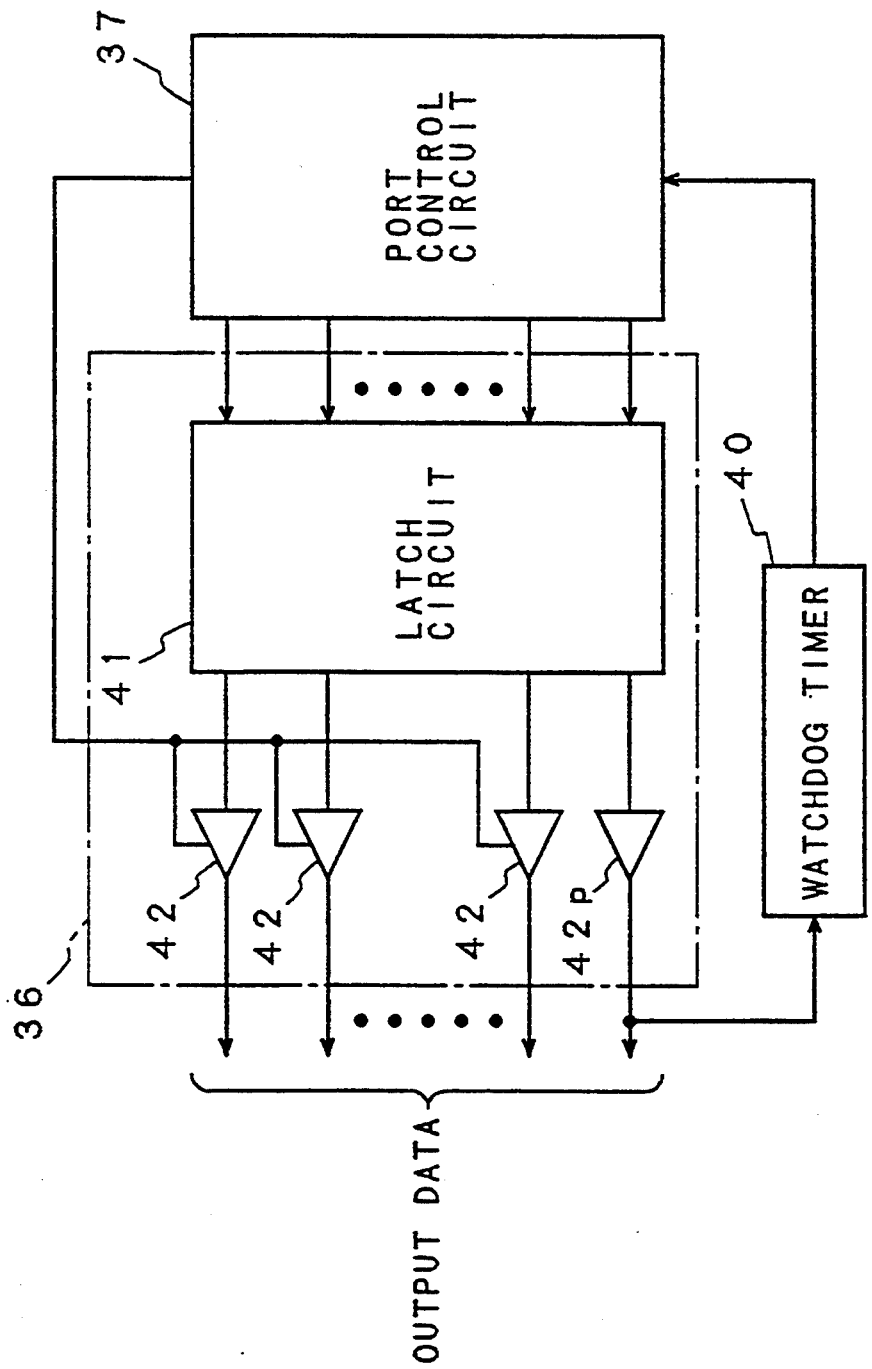
FIG. 10 is a diagram showing an example of the arrangement of an output port, port control circuit, and watchdog timer shown in FIG. 8.

Thus, the output port 36 is set at the predetermined state. For example, the output port 36 can be constructed as shown in FIG. 10, in which the data supplied from the port control circuit 37 is retained by a latch circuit 41, and the latched data is output through a plurality of output buffers 42. To set the output port 36 at high impedance (floating) state, a three-state buffer connected to the port control circuit 37 may be used for each output buffer 42 (see FIG. 10). The output buffer 42p supplies data also to the timer 40, unlike the other output buffers 42.

On detecting the change of the timer output to "L" state, the port control circuit 37 controls the operation of the output port 36 so that the outputs of the output buffers 42 can be set at the floating state. Since the operation of the output buffer 42p is not controlled by the port control circuit 37, the output value of the output port 42p is held at the same level as that input from the port control circuit 37.

Accordingly, in this embodiment, in cases where the seventh-bit data of the output port A, which is supplied to the timer, becomes abnormal, the port control circuit controls the output port to bring it to the predetermined state.

The output port 36 may be constructed differently as shown in FIG. 11, in which the output buffers 42 are connected also to the timer 40 so that the output of the timer 40 is directly supplied to the output port 36. In this case, the output port 36 may operate such that, when the output of the timer 40 changes to "L" level, the outputs of the output port 36 are set at the floating state.

Thus, in this embodiment, when the seventh-bit data of the output port A, which is supplied to the timer, becomes abnormal, the port control circuit controls the output port and brings it to the predetermined state.

An example of the arrangement of the receiving buffer, port control circuit and output port will be now described in detail with reference to FIG. 12.

The receiving buffer 39 for storing data supplied from the communication control circuit may comprise, for example, shift registers 39a to 39p which serially store data in succession, as shown in FIG. 12. The shift registers 39a to 39p output the stored data in parallel to the port control circuit 37 on a bit-by-bit basis. The number of the shift registers 39a to 39p equals the number of bits corresponding to the number of the output ports, and the illustrated example has a 16-bit configuration.

The port control circuit 37 transfers the input data to the output port 36 in accordance with the output logic of the timer 40.

The output port 36 is composed of latch circuits 41a to 41p associated with the shift registers 39a to 39p, respectively, and output buffers 42a to 42p for storing data from the respective latch circuits 41a to 41p, and outputs the data supplied from the port control circuit 37 to loads. In the illustrated arrangement, the output port for supplying data to the timer 40 is the one which is associated with the 16th-bit, last-stage shift register 39p (corresponding to the seventh bit of the output port A). The timer 40 cannot be reset not only when the data communication control becomes abnormal, but also when the shift registers become defective. The above arrangement permits the output of the timer 40 to change to "L" level.

In the node constructed as above, when a frame is received, the data in the frame is successively shifted from the first-bit shift register 39a to the right. If, for example, the third-bit shift register 39c becomes defective and the output thereof is fixed at "H" level, then data output from the third- to 16th-bit shift registers 39c to 39p all turn to "H" level. Accordingly, the output port associated with the 16th-bit shift register 39p remains at "H" level. Thus, the timer 40 is not reset and the output thereof turns to "L" level.

In the case where the data output from, e.g., the third-bit shift register is monitored, only a fault of the first to third bits can be detected. By letting the last-bit shift register to be monitored by the timer 40, as in the illustrated embodiment, it is possible to effect fault detection for all bits of the shift registers.

Further, in this embodiment, when the abnormality is removed and normal data transmission between the nodes is recovered, the seventh-bit data of the output port A begins to alternate "L" and "H" at the predetermined intervals. Accordingly, the timer 40 is reset when the output data turns to low-level, and the timer output again changes to "H" level. As a result, the operation of the port control circuit 37 is brought to normal state, and data on the bus MB is supplied to the loads via the output port 36.

Thus, in this embodiment, the data which is repeatedly output from the output port at the predetermined intervals is detected by the watchdog timer, and the result is notified to the port control circuit. Accordingly, in cases where unexpected data is written in the receiving buffer due to an erroneous state, such as fault of the communication control circuit or stoppage of the oscillation of the clock pulse generator and thus the above data becomes abnormal, the output port can be brought to the predetermined state by the port control circuit, whereby the loads are held in safe state and abnormality of the loads can be prevented.

In the case where the abnormality detection need be selectively effected, unlike the aforementioned embodiment, the watchdog timer may be modified such that it has an enable input by means of which the detection is enabled or disabled, for example.

The communication control circuit and the port control circuit of this embodiment may each be constructed using a logic circuit, or be achieved by computer control. Also, the transmitting buffer and the receiving buffer may be part of the communication control circuit comprising an LSI or the like.

The frame shown in FIG. 6(a) is transmitted at intervals of 100 ms, though it originally need not be cyclically transmitted, thus making the transmission line busy. Therefore, data contained in such a frame may alternatively be transmitted by means of a frame which inherently should be cyclically transmitted, like the frame shown in FIG. 6(b), thereby making the transmission line of the multiplex transmission system less busy.

Specifically, the engine node 4 transmits the frame shown in FIG. 6(b) at intervals of 100 ms, while causing the seventh bit in DATA3, which is not allocated to transmission data, to alternate "1" and "0". Although the engine node 4 is an I/O node, it can freely alter the data input to the input port from the output port of the microcomputer. The frame of FIG. 6(b) is originally addressed to the instrument panel node alone, but since the door node connected to the power window motor is a basic node, it can receive the frame by previously storing the ID in the RAM of the microcomputer. When the frame is received, only the seventh bit in DATA3 may be set valid by suitably programming the microcomputer.

The door node may be designed such that the output port associated with the seventh bit in DATA3 is monitored, and that, when the data from the output port does not change, the output port is brought to a predetermined state. In this case, the motor is driven to open the power window, for example. Since, in the basic node, change in the data from the output port can be monitored by the microcomputer, no additional timer is required.

In the embodiment, those frames for driving the load connected to the output port are monitored so that the output port can be brought to the predetermined state, but where a determination can be made as to whether normal communication is possible, it is unnecessary to restrict the frames to be monitored. Although not illustrated, where there is control data which is transmitted cyclically while alternating "1" and "0", abnormality of data can be detected by monitoring the control data bit, without changing the degree of congestion of the transmission line or the load on the microcomputer in each node.

In the foregoing embodiments, frames are transmitted from one node such that part of the data area in the frames alternately assumes "1" and "0". However, this invention is not limited to such configuration, and two frames may alternatively be used for the same purpose. For example, in the case of frames to be received by the door node, such as those shown in (a) and (b) of FIG. 7, the frame of FIG. 7(a) is transmitted with the fifth bit in DATA3 fixed at "1", while the frame of FIG. 7(b) is transmitted with the fifth bit in DATA3 fixed at "0". Where the timer period is 250 ms, as in the aforementioned embodiments, the frames of FIG. 7(a) and FIG. 7(b) may be each cyclically transmitted at the intervals of 200 ms.

In this case, although the degree of congestion of the transmission line remains the same, the load on the microcomputer in each node can be reduced. This is effective in cases where the microcomputer load of each node is heavy. The advantage is still more prominent where the frames of FIG. 7(a) and FIG. 7(b) are cyclically transmitted in the automobile multiplex transmission system.

Furthermore, in the above embodiments, the node is constructed such that the input port, the output port, the communication control circuit, and the port control circuit or CPU core are packaged into a single IC. However, this invention is not limited to this configuration, and similar advantages can be achieved even when these components are formed as separate ICs.

What is claimed is:

1. A multiplex transmission method for transmitting data with a frame format in a multiplex transmission system among multiplex transmission apparatuses interconnected by a transmission line, comprising the steps of:
    successively transmitting data frames from a transmitting multiplex transmission apparatus which is one of the multiplex transmission apparatuses, such that at least part of predetermined data in the data frames changes in a predetermined manner; and
    successively receiving the data frames transmitted from the transmitting multiplex transmission apparatus by a receiving multiplex transmission apparatus which is one of the multiplex transmission apparatuses, the receiving multiplex transmission apparatus being different from the transmitting multiplex transmission apparatus, the receiving multiplex transmission apparatus outputting data in each of the data frames from an output port thereof to a load to be controlled, monitoring the data from said output port in response to said data in each of the data frames, and controlling said output port to a predetermined state when said at least part of the predetermined data does not change in a predetermined manner in response to the predetermined data received immediately before due to an abnormal state caused by a fault in the multiplex transmission system.

2. In a multiplex transmission system, a multiplex transmission apparatus for transmitting data to another multiplex transmission apparatus connected thereto via a transmission line, the multiplex transmission apparatus comprising:
    communication control means for successively receiving data from the transmission line, and for executing receiving process control;
    receiving storage means for storing the successively received data;
    at least one output port for successively outputting predetermined data in said receiving storage means to a load to be controlled; and
    port control means including:
        means for monitoring data supplied to a load from said receiving storage means via said at least one output port;
        means for detecting a change in at least part of said predetermined data; and
        means for controlling said at least one output port to a predetermined state when said part of said predetermined data does not change in a predetermined manner in response to predetermined data received immediately before, due to an abnormal state caused by a fault in the multiplex transmission system.

3. In a multiplex transmission system, a multiplex transmission apparatus for transmitting data to another multiplex transmission apparatus connected thereto via a transmission line, the multiplex transmission apparatus comprising:
    communication control means for successively receiving data from said transmission line and for executing receiving process control;
    receiving storage means for storing the successively received data;
    at least one output port for successively outputting predetermined data in said receiving storage means to a load to be controlled; and
    port control means including:
        means for monitoring data supplied to a load from said receiving storage means via said at least one output port;
        means for detecting a change in at least part of said predetermined data; and
        means for controlling said at least on output port to a predetermined state when said part of said predetermined data does not change in a predetermined manner in response to predetermined data received immediately before, due to an abnormal state caused by a fault in the multiplex transmission system.

4. The multiplex transmission apparatus according to claim 2 or 3, wherein:
    said at least one output port includes a plurality of output ports; and
    said controlling means of said port control means prevents one of said plurality of output ports whose data is monitored from being set in the predetermined state.

5. The multiplex transmission apparatus according to claim 2 or 3, wherein:
    said receiving storage means serially stores data supplied from the transmission line; and
    said monitoring means of said port control means monitors data stored in a last-stage bit of said receiving storage means.

6. The multiplex transmission apparatus according to claim 4, wherein:
    said receiving storage means serially stores data supplied from the transmission line; and
    said monitoring means of said port control means monitors data stored in a last-stage bit of said receiving storage means.

7. In a multiplex transmission system, a multiplex transmission apparatus for transmitting data to another multiplex transmission apparatus connected thereto via a transmission line, the multiplex transmission system comprising:

communication control means for successively receiving data from said transmission line, and for executing receiving process control;

receiving storage means for storing the successively received data;

at least one output port for successively outputting predetermined data in said receiving storage means to a load to be controlled;

change detecting means, to which at least part of data output from said at least one output port is successively input, for detecting a change of said at least part of data from the data input thereto immediately before; and port control means for controlling said at least one output port to set said at least one output port in a predetermined state in accordance with a result of the change detection.

8. In a multiplex transmission system, a multiplex transmission apparatus for transmitting data to another multiplex transmission apparatus connected thereto via a transmission line, the multiplex transmission system comprising:

communication control means for successively receiving data from the transmission line, and for executing receiving process control;

receiving storage means for storing the successively received data;

a plurality of output ports for successively outputting predetermined data in said receiving storage means to a load to be controlled;

change detecting means for detecting a change in part of said data outputted via a predetermined output port of said plurality of output ports; and port control means for controlling said predetermined output port to a predetermined state in accordance with a result of the change detection, said port control means preventing at least one output port whose data is detected by said change detecting means as having been changed, from being set in the predetermined state.

9. The multiplex transmission apparatus according to claim 7 or 8, wherein:

said receiving storage means serially stores data supplied from the transmission line; and said change detecting means monitors data stored in a last-stage bit of said receiving storage means.

10. The multiplex transmission apparatus according to any one of claims 2, 3, 7 or 8, wherein said port control means controls said at least one output port to set said controlled output port in a predetermined high-impedance state.

11. The multiplex transmission apparatus according to claim 4, wherein said port control means controls said one output port to set said controlled output port in a predetermined high impedance state.

12. The multiplex transmission apparatus according to claim 5, wherein said port control means controls said at least one output port to set said controlled output port in a predetermined high impedance state.

13. The multiplex transmission apparatus according to claim 6, wherein said port control means controls said at least one output port to set said controlled output port in a predetermined high impedance state.

14. The multiplex transmission apparatus according to any one of claims 2, 3, 7 or 8, wherein said port control means sets an output port in the predetermined state such that the load to be controlled by said set output port is held in a safe state.

15. The multiplex transmission apparatus according to claim 4, wherein said port control means sets an output port in the predetermined state such that the load to be controlled by said set output port is held in a safe state.

16. The multiplex transmission apparatus according to claim 5, wherein said port control means sets an output port in the predetermined state such that the load to be controlled by said set output port is held in a safe state.

17. The multiplex transmission apparatus according to claim 6, wherein said port control means sets an output port in the predetermined state such that the load to be controlled by said set output port is held in a safe state.

18. The multiplex transmission apparatus according to claim 12, wherein said port control means sets an output port in the predetermined state such that the load to be controlled by said set output port is held in a safe state.

19. The multiplex transmission apparatus according to claim 11, wherein said port control means sets an output port in the predetermined state such that the load to be controlled by said set output port is held in a safe state.

20. The multiplex transmission apparatus according to claim 12, wherein said port control means sets an output port in the predetermined state such that the load to be controlled by said set output port is held in a safe state.

21. The multiplex transmission apparatus according to claim 13, wherein said port control means sets an output port in the predetermined state such that the load to be controlled by said set output port is held in a safe state.

* * * * *